(12) United States Patent
Suzuki et al.

(10) Patent No.: US 11,067,017 B2
(45) Date of Patent: Jul. 20, 2021

(54) CONTROL DEVICE FOR INTERNAL COMBUSTION ENGINE

(71) Applicant: TOYOTA JIDOSHA KABUSHIKI KAISHA, Toyota (JP)

(72) Inventors: Kazuya Suzuki, Shizuoka (JP); Takahiko Fujiwara, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/931,711

(22) Filed: May 14, 2020

(65) Prior Publication Data
US 2021/0010434 A1    Jan. 14, 2021

(30) Foreign Application Priority Data

Jul. 12, 2019   (JP) .............................. JP2019-130005

(51) Int. Cl.
*F02D 41/02*   (2006.01)
*F01N 3/027*   (2006.01)
(Continued)

(52) U.S. Cl.
CPC ........... *F02D 41/029* (2013.01); *F01N 3/021* (2013.01); *F01N 3/027* (2013.01); *F01N 3/0232* (2013.01); *F01N 3/0857* (2013.01); *F01N 3/22* (2013.01); *F01N 9/002* (2013.01); *F02D 41/0002* (2013.01); *F02D 41/38* (2013.01); *F01N 2560/06* (2013.01); *F01N 2570/10* (2013.01); *F01N 2900/1402* (2013.01); *F01N 2900/1404* (2013.01); *F02D 2041/0265* (2013.01); *F02D 2200/0802* (2013.01)

(58) Field of Classification Search
CPC ........ F01N 3/021; F01N 3/0232; F01N 3/027; F01N 3/0857; F01N 3/22; F01N 9/002; F01N 2560/06; F01N 2570/10; F01N 2900/1402; F01N 2900/1404; F02D 41/0002; F02D 41/029; F02D 41/38; F02D 2041/0265; F02D 2200/0802
See application file for complete search history.

(56) References Cited

U.S. PATENT DOCUMENTS

2011/0131954 A1*   6/2011   Parnin ..................... F01N 3/027
                                                            60/276
2017/0211442 A1    7/2017   Umemoto et al.
2017/0284268 A1*  10/2017   Nakagawa .............. F01N 3/021

FOREIGN PATENT DOCUMENTS

JP       2015-166705 A     9/2015
JP       2017-129105 A     7/2017

* cited by examiner

*Primary Examiner* — Audrey K Bradley
(74) *Attorney, Agent, or Firm* — Oliff PLC

(57) ABSTRACT

A control device for the internal combustion engine is provided with a carbon dioxide concentration control part configured to cause a concentration of carbon dioxide in exhaust flowing into the filter to decrease when the temperature of the filter becomes a predetermined first temperature setting or more and less than a predetermined second temperature setting. The first temperature setting is made a temperature selected from a temperature band at which ash deposited on the filter can be made to be separate from the filter when the inside of the filter is in an atmosphere where the concentration of carbon dioxide is lower than when it is in an exhaust atmosphere. The second temperature setting is made a temperature set so as to prevent excessive temperature rise of the catalyst device.

8 Claims, 13 Drawing Sheets

(51) Int. Cl.
*F01N 3/08* (2006.01)
*F01N 3/22* (2006.01)
*F02D 41/00* (2006.01)
*F02D 41/38* (2006.01)
*F01N 3/021* (2006.01)
*F01N 3/02* (2006.01)
*F01N 9/00* (2006.01)
*F01N 3/023* (2006.01)

CONTROL DEVICE FOR INTERNAL COMBUSTION ENGINE

FIELD

The present disclosure relates to a control device for an internal combustion engine.

BACKGROUND

Japanese Unexamined Patent Publication No. 2017-129105 discloses a conventional control device of an internal combustion engine configured to make ash deposited on a particulate filter separate from the particulate filter by making a particulate temperature of a filter rise to a predetermined ash separation temperature to maintain it at the ash separation temperature as ash separation control.

SUMMARY

However, the particulate temperature of a filter at which separation of ash becomes possible changes according to the concentration of carbon dioxide in the particulate filter. Specifically, the higher the concentration of carbon dioxide in the exhaust flowing into the particulate filter, the higher the particulate temperature of the filter at which separation of ash becomes possible tends to be. For this reason, in the system of the above-mentioned PTL 1 which did not consider the concentration of carbon dioxide in the exhaust flowing into the particulate filter, when the concentration of carbon dioxide in the exhaust was high, the ash separation temperature was liable to end up becoming too high a temperature.

The present disclosure was made taking note of such a problem and has as its object to cause ash deposited on a particulate filter to separate from the particulate filter in the low temperature region.

To solve this problem, the internal combustion engine according to one aspect of the present disclosure comprises an engine body, a filter provided in an exhaust passage of the engine body and configure to trap particulate matter in exhaust, and a catalyst device provided in the exhaust passage at the upstream side from the filter in the direction of exhaust flow. A control device configured to control the internal combustion engine comprises a carbon dioxide concentration control part configured to cause a concentration of carbon dioxide in exhaust flowing into the filter to decrease when the temperature of the filter becomes a predetermined first temperature setting or more and less than a predetermined second temperature setting higher than the first temperature setting. The first temperature setting is a temperature selected from a temperature band at which ash deposited on the filter can be made to separate from the filter when the inside of the filter is in an atmosphere where the concentration of carbon dioxide is lower than when it is in an exhaust atmosphere. The second temperature setting is a temperature set so as to prevent excessive temperature rise of the catalyst device.

According to this aspect of the present disclosure, by making the concentration of carbon dioxide in the exhaust drop, it is possible to make the concentration of carbon dioxide in the filter approach the concentration of carbon dioxide in the air, so it is possible to make the ash separation temperature drop. For this reason, it is possible to make ash deposited on the filter separate from the filter at a low temperature band.

DESCRIPTION OF EMBODIMENTS

Figure 1:
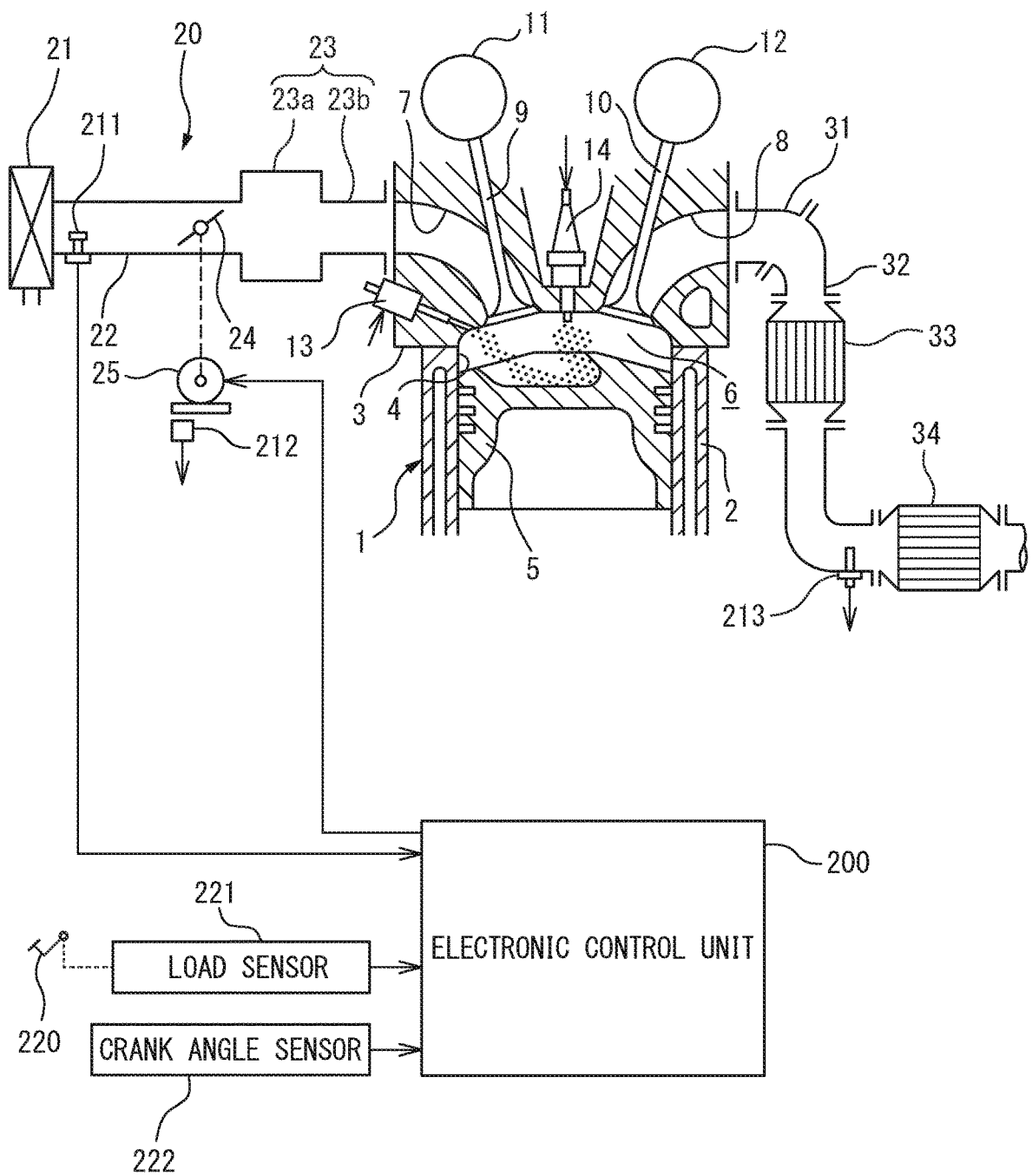
FIG. 1 is a schematic view of the configuration of an internal combustion engine according to a first embodiment of the present disclosure and an electronic control unit for controlling the internal combustion engine.

Below, referring to the drawings, embodiments of the present disclosure will be explained in detail. Note that, in the following explanation, similar component elements are assigned the same reference notations.

First Embodiment

FIG. 1 is a schematic view of the configuration of an internal combustion engine 100 according to a first embodiment of the present disclosure and an electronic control unit 200 for controlling the internal combustion engine 100.

The internal combustion engine 100 according to the present embodiment is a spark ignition type gasoline engine provided with an engine body 1, intake system 20, and exhaust system 30. Note that the type of the internal combustion engine 100 is not particularly limited and may also be a homogenous charged compression ignition type gasoline engine or may be a diesel engine.

The engine body 1 is provided with a cylinder block 2 and cylinder head 3 fixed on the top surface of the cylinder block 2.

The cylinder block 2 is formed with a plurality of cylinders 4. Inside of the cylinders 4, pistons 5 moving back and forth inside of the cylinders by receiving combustion pressure are held. The pistons 5 are connected through connecting rods (not shown) to a crankshaft (not shown). Using the crankshaft, the reciprocating motions of the pistons 5 are converted to rotary motion. Spaces defined by the inside wall surface of the cylinder head 3, inside wall surfaces of the cylinders 4, and crowns of the pistons form the combustion chambers 6.

At the cylinder head 3, intake ports 7 opening to one side surface of the cylinder head 3 and opening to the combustion chambers 6 and exhaust ports 8 opening to another side surface of the cylinder head 3 and opening to the combustion chambers 6 are formed.

Further, the cylinder head 3 has attached to it intake valves 9 for opening and closing the openings between the combustion chambers 6 and intake ports 7, exhaust valves 10 for opening and closing the openings between the combustion chambers 6 and exhaust ports 8, intake cam shafts 11 for driving operations of the intake valves 9, and exhaust cam shafts 12 for driving operations of the exhaust valves 10.

Furthermore, the cylinder head 3 has attached to it fuel injectors 13 for injecting fuel to the insides of the combustion chambers 6 and spark plugs 14 for igniting the air-fuel mixtures of fuel and air injected from the fuel injectors 13 to inside of the combustion chambers 6. Note that the fuel injectors 13 may also be attached to the cylinder head 3 so as to enable fuel to be injected to the insides of the intake ports 7.

The intake system 20 is a system for guiding air through the intake ports 7 to the insides of the cylinders 4 and is provided with an air cleaner 21, intake pipe 22, intake manifold 23, air flow meter 211, electronic control type throttle valve 24, throttle actuator 25, and throttle sensor 212.

The air cleaner 21 removes sand and other foreign matter contained in the air.

The intake pipe 22 is connected at one end to the air cleaner 21 and is connected at the other end to a surge tank 23a of the intake manifold 23. Due to the intake pipe 22, air flowing through the air cleaner 21 to the inside of the intake pipe 22 (intake air) is guided to the surge tank 23a of the intake manifold 23.

The intake manifold 23 is provided with the surge tank 23a and a plurality of intake runners 23b branched from the surge tank 23a and connected to the openings of the intake ports 7 formed at the side surface of the cylinder head. The air guided to the surge tank 23a is equally distributed through the intake runners 23b to the insides of the cylinders 4. In this way, the intake pipe 22, intake manifold 23, and intake ports 7 form an intake passage for guiding air to the insides of the cylinders 4.

The air flow meter 211 is provided inside of the intake pipe 22. The air flow meter 211 detects the amount of air flowing through the inside of the intake pipe 22 (below, "intake amount").

The throttle valve 24 is provided inside of the intake pipe 22 at the downstream side from the air flow meter 211. The throttle valve 24 is driven by the throttle actuator 25 and makes the passage sectional area of the intake pipe 22 change continuously or in stages. The intake amounts taken into the cylinders 4 are adjusted by the throttle actuator 25 adjusting the opening degree TH of the throttle valve 24 (below, referred to as the "throttle opening degree"). The throttle opening degree is detected by the throttle sensor 212.

The exhaust system 30 is a system which cleans the combustion gas generated inside the combustion chambers 6 (below, referred to as "exhaust") and discharges it to the outside air and is provided with an exhaust manifold 31, exhaust pipe 32, catalyst device 33, wall flow type particulate filter 34, and exhaust temperature sensor 213.

The exhaust manifold 31 is provided with a plurality of exhaust runners connected to openings of the exhaust ports 8 formed at the side surface of the cylinder head and a header pipe which collects the exhaust runners into a single pipe.

The exhaust pipe 32 is connected at one end to the header pipe of the exhaust manifold 31 and opens at the other end to the outside air. Exhaust discharged from the cylinders 4 through the exhaust ports 8 to the exhaust manifold 31 flows through the exhaust pipe 32 and is discharged to the outside air.

The catalyst device 33 is comprised of a support on which an exhaust purification catalyst is carried and is provided at the exhaust pipe 32. The exhaust purification catalyst is, for example, an oxidation catalyst (two-way catalyst) or a three-way catalyst. It is not limited to these. Suitable catalysts can be used in accordance with the type or application of the internal combustion engine 100. In the present embodiment, as the exhaust purification catalyst, a three-way catalyst is used. When using a three-way catalyst as the exhaust purification catalyst, the harmful substances in the exhaust such as the hydrocarbons HC, carbon monoxide CO, and nitrogen oxides $NO_X$ are removed by the catalyst device 33.

Figure 2A:
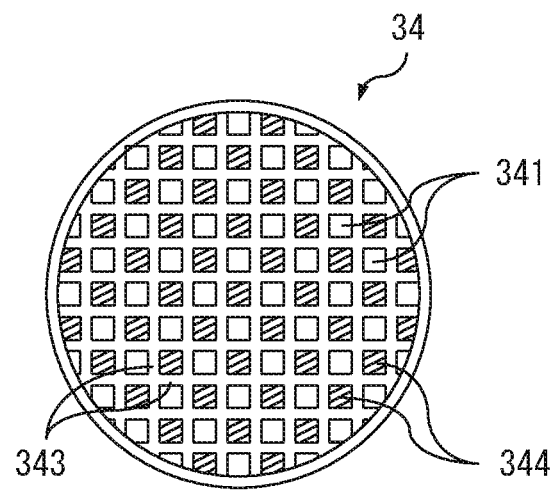
FIG. 2A is a front view of a particulate filter according to the first embodiment of the present disclosure.
Figure 2B:
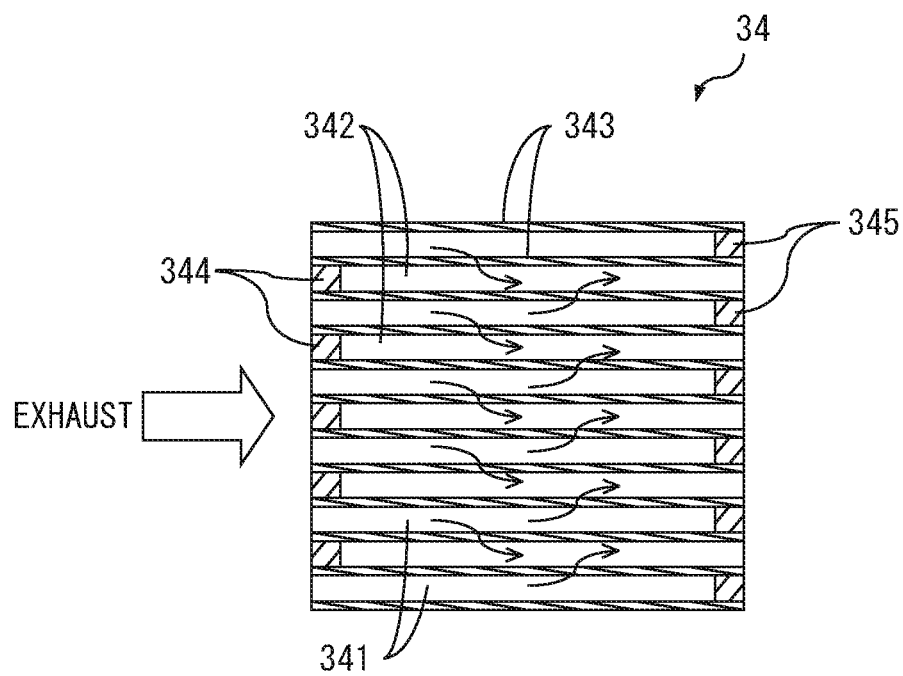
FIG. 2B is a side cross-sectional view of the particulate filter according to the first embodiment of the present disclosure.

The particulate filter 34 is provided in the exhaust pipe 32 at the downstream side from the catalyst device 33 in the direction of exhaust flow and traps the particulate contained in the exhaust (particulate matter). FIG. 2A and FIG. 2B are views explaining the structure of the particulate filter 34 according to the present embodiment. FIG. 2A is a front view of a particulate filter 34, while FIG. 2B is a side cross-sectional view of the particulate filter 34.

As shown in FIG. 2A and FIG. 2B, the particulate filter 34 forms a honeycomb structure comprised of a plurality of exhaust flow passages 341, 342 extending in parallel to each other and partition walls 343 partitioning the exhaust flow passages 341, 342 from each other.

The exhaust flow passages 341, 342 are comprised of exhaust inflow passages 341 which are opened at their upstream ends and closed at their downstream ends by downstream plugs 345 and of exhaust outflow passages 342 which are closed at their upstream ends by upstream plugs 344 and opened at their downstream ends. Note that, in FIG. 2A, the hatched parts show the upstream plugs 344. Therefore, the exhaust inflow passages 341 and the exhaust outflow passage 342 are alternately arranged through thin partition walls 343. In other words, the exhaust inflow passages 341 and the exhaust outflow passage 342 are arranged so that each exhaust inflow passage 341 is surrounded by four exhaust outflow passages 342 and so that each exhaust outflow passage 342 is surrounded by four exhaust inflow passages 341.

The partition walls 343 are formed from a porous material, for example, cordierite, silicon carbonate, silicon nitride, zirconia, titania, alumina, silica, mullite, lithium aluminum silicate, and zirconium phosphate or other such ceramic. Therefore, as shown by the arrows in FIG. 2B, exhaust first flows into the exhaust inflow passages 341, then passes through the surrounding partition walls 343 to flow out into the adjoining exhaust outflow passages 342. In this way, the partition walls 343 constitute the inside circumferential surfaces of the exhaust inflow passages 341.

Returning to FIG. 1, the exhaust temperature sensor 213 is provided in the exhaust pipe 32 near the entrance side of the particulate filter 34 and detects the temperature of the exhaust flowing into the particulate filter 34. In the present embodiment, the temperature TF of the particulate filter 34 (below, referred to as the "filter temperature") is estimated based on the exhaust temperature detected by the exhaust temperature sensor 213. However, the filter temperature TF is not limited to being estimated by the above such method. For example, it may be estimated by suitably selecting a technique from among the various known ones such as estimating it in accordance with the engine operating state. In estimating the filter temperature TF, an exhaust temperature sensor 213 is not necessarily required.

The electronic control unit 200 is a microcomputer provided with components connected to each other by a bidirectional bus such as a central processing unit (CPU), read only memory (ROM), random access memory (RAM), input port, and output port.

The electronic control unit 200 receives as input the output signals from various sensors such as the above-mentioned air flow meter 211 or throttle sensor 212 and exhaust temperature sensor 213 and also a load sensor 211 generating an output voltage proportional to an amount of depression of an accelerator pedal 220 corresponding to the load of the engine body 1 (engine load) (below, referred to as an "amount of depression of accelerator pedal"), crank angle sensor 222 generating an output pulse every time the crankshaft (not shown) of the engine body 1 rotates by for example 15° as a signal for calculating the engine rotational speed, etc.

Further, the electronic control unit 200 controls the fuel injectors 13 and the throttle valve 24 etc. based on the output signals of various sensors which are input etc. so as to control the internal combustion engine 100. Below, the ash separation control of one of the types of control of the internal combustion engine 100 performed by the electronic control unit 200 will be explained.

The exhaust contains, in addition to the above-mentioned particulate, a noncombustible combustion product called "ash" mainly comprised of calcium carbonate $CaCO_3$. This ash is also trapped together with the particulate at the particulate filter 34.

Figure 3A:
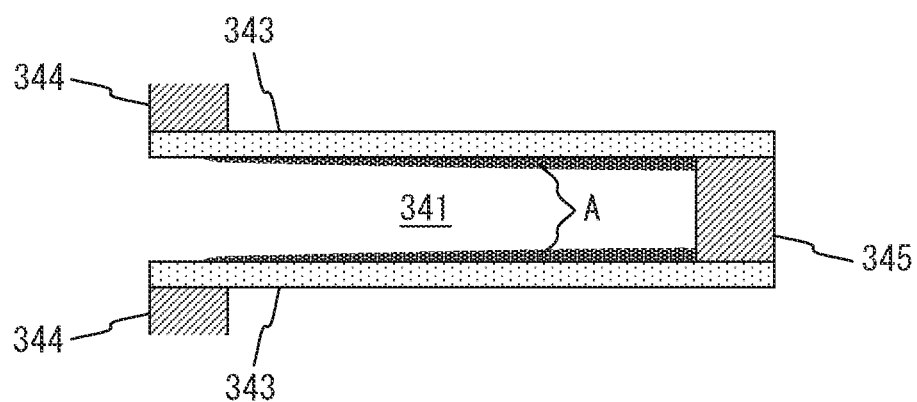
FIG. 3A is a schematic view showing a state of ash in a particulate filter.

The particulate trapped by the particulate filter 34 is burned inside the particulate filter 34 to be removed from the particulate filter 34 if the filter temperature TF becomes a predetermined PM removal temperature (for example 600° C.) or more. However, the ash trapped at the particulate filter 34 is a noncombustible combustion product, so even if the filter temperature TF becomes the PM removal temperature or more, it cannot be burned off. For this reason, the ash is not removed from the particulate filter 34 but, as shown in FIG. 3A by A, deposits and builds up on the inside circumferential surfaces of the exhaust inflow passages 341 so as to cover the inside circumferential surfaces of the exhaust inflow passages 341 from the upstream end sides to the downstream end sides of the exhaust inflow passages 341. This being so, the ash causes a pressure loss of the particulate filter 34 to increase and as a result the back pressure to be liable to increase and the engine output to be liable to fall.

Further, as the ash deposited and building up in the exhaust inflow passages 341 increases in amount, the particles of the ash bind with each other and layers are formed. In the process, the ash and partition walls 343 for example engage with each other by anchoring. As a result, layers of ash strongly deposit on the inside wall surfaces of the exhaust inflow passages 341. For this reason, for example, even if the flow of exhaust acts on the ash, it is difficult to separate the ash from the inside wall surfaces of the exhaust inflow passages 341.

On the other hand, in the ash, if the filter temperature TF becomes a predetermined ash separation temperature or more, the main constituent of the ash, that is, calcium carbonate $CaCO_3$, is converted to calcium oxide CaO. That is, the calcium carbonate $CaCO_3$ is broken down into calcium oxide CaO and carbon dioxide $CO_2$. The gas carbon dioxide $CO_2$ is discharged from the layers of ash. As a result, the particle size of the ash becomes smaller and the density of the layers of ash falls, so the bonds between the particles of ash and the bonds between the ash and partition walls 343 are weakened. Further, the binding energy of calcium oxide CaO is higher than the binding energy of calcium carbonate $CaCO_3$. In ion crystals, a material with a high binding energy is harder than a material with a low binding energy. For this reason, if calcium carbonate $CaCO_3$ is converted to calcium oxide CaO, the ash will become harder and the layers of ash will become brittle. Therefore, ash can be made to easily separate from the inside wall surfaces of the exhaust inflow passages 341.

Figure 3B:
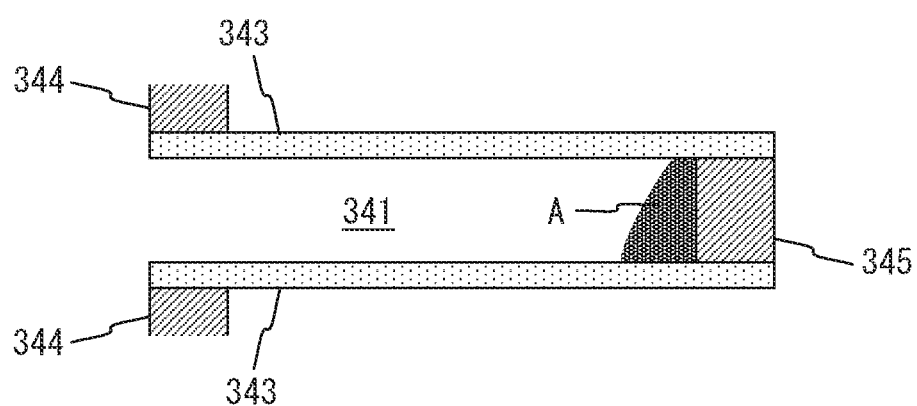
FIG. 3B is a schematic view showing a state of ash in a particulate filter.

In this way, by converting ash to calcium oxide CaO to make it separate from the inside wall surfaces of the exhaust inflow passages 341, as shown in A of FIG. 3B, the exhaust running through the insides of the exhaust inflow passages 341 can be used to make the ash move to the downstream ends of the exhaust inflow passages 341. Further, the ash converted to calcium oxide CaO and made to separate from the inside circumferential surfaces of the exhaust inflow passages 341 is small in particle size, so part of the separated ash passes through the insides of the partition walls 343 and is discharged to the insides of the adjoining exhaust outflow passages 342 in the process of moving toward the downstream ends of the exhaust inflow passages 341.

Therefore, by making the filter temperature TF the ash separation temperature or more, it is possible to reduce the pressure loss of the particulate filter 34. However, the ash separation temperature changes in accordance with the concentration of carbon dioxide in the exhaust flowing into the particulate filter 34. Specifically, the ash separation temperature tends to become higher the higher the concentration of carbon dioxide in the exhaust flowing into the particulate filter 34.

Figure 4:
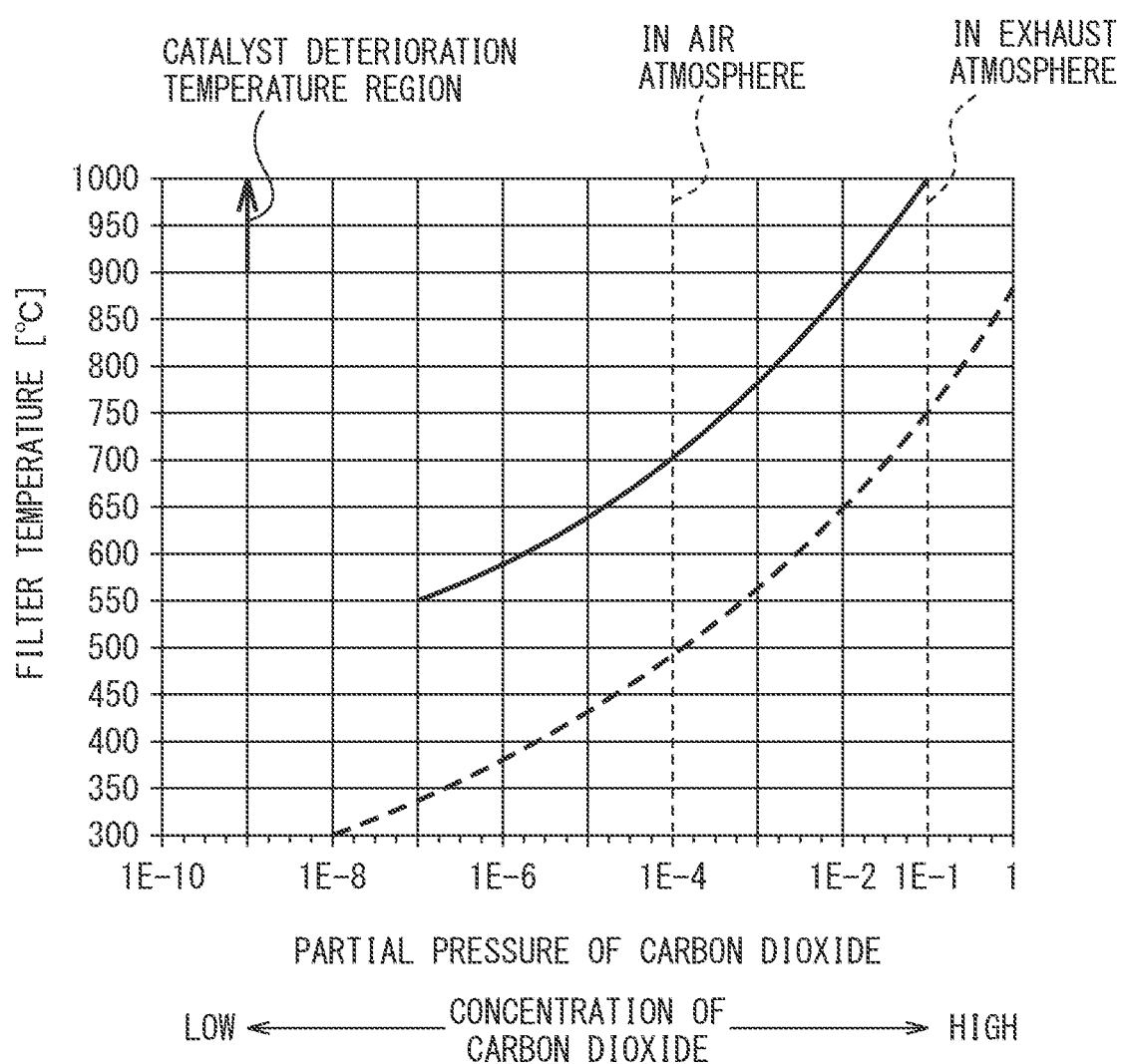
FIG. 4 is a view showing a relationship between a concentration of carbon dioxide in exhaust (carbon dioxide partial pressure) and an ash separation temperature.

FIG. 4 is a view showing the relationship between the concentration of carbon dioxide in the exhaust (carbon dioxide partial pressure) and ash separation temperature.

As explained above, the main constituent of ash is calcium carbonate $CaCO_3$, but in actuality the ash is a complex compound in which other constituents (for example calcium phosphate $Ca_3(PO_4)_2$ etc.) are also contained. For this reason, the ash separation temperature shown by the solid line in FIG. 4 becomes higher than the temperature required for converting pure calcium carbonate $CaCO_3$ shown by the broken line in FIG. 4 to calcium oxide CaO even if the concentration of carbon dioxide in the exhaust is the same.

Further, as shown by the solid line in FIG. 4, it is learned that the higher the concentration of carbon dioxide becomes (the higher the carbon dioxide partial pressure), the higher the ash separation temperature becomes. Further, a gasoline engine tends to become higher in the concentration of carbon dioxide in the exhaust compared with a diesel engine. If the internal combustion engine 100 is a gasoline engine, as shown in FIG. 4, the ash separation temperature when the particulate filter 34 is in an air atmosphere becomes about 700° C. On the other hand, when the particulate filter 34 is in an exhaust atmosphere, the ash separation temperature becomes a high temperature exceeding 900° C.

Note that, in the example shown in FIG. 4, the time when the particulate filter 34 is in an air atmosphere is the time when air is flowing into the particulate filter 34 without burning fuel in the combustion chambers 6. Further, the time when the particulate filter 34 is in an exhaust atmosphere is the time when burning an air-fuel mixture inside the combustion chambers 6 with an air excess rate λ of 1 and the exhaust discharged from the combustion chambers 6 flows into the particulate filter 34.

In this way, when the internal combustion engine 100 is a gasoline engine, the ash separation temperature when the particulate filter 34 is in an exhaust atmosphere becomes a high temperature exceeding 900° C. For this reason, if, to remove the ash from the inside circumferential surfaces of the exhaust inflow passages 341, for example, injecting additional fuel from the fuel injectors 13 during the expansion stroke or exhaust stroke for control for making the filter temperature rise to a temperature exceeding 900° C., the temperature of the catalyst device 33 placed at the upstream side of the particulate filter 34 in the direction of exhaust flow also rises, so the temperature of the catalyst device 33 is liable to become too high and the catalyst device 33 is liable to deteriorate.

On the other hand, a gasoline engine tends to become higher in exhaust temperature compared with a diesel engine. Therefore, if, like in the present embodiment, the internal combustion engine 100 is a gasoline engine, even if not performing specific control for making the filter temperature rise, that is, even during normal operation, the filter temperature TF can be made 700° C. or more.

Therefore, in the present embodiment, if making the ash separation temperature when the particulate filter 34 is in an air atmosphere the first temperature setting TF1, when performing fuel cut control when the filter temperature TF becomes the first temperature setting TF1 or more, the throttle valve 24 (more specifically, the throttle actuator 25) is controlled so that the throttle opening degree TH during the fuel cut control becomes a predetermined ash separation opening degree TH2 larger than the normal opening degree TH1 in usual flue cut control performed at other scenes.

"Fuel cut control" is control stopping the feed of fuel to the combustion chambers 6 of the engine body 1 when a predetermined fuel cut condition stands during operation of the internal combustion engine 100 such as the time of deceleration of the vehicle in which the internal combustion engine 100 is mounted. If fuel cut control is performed, the feed of fuel to the combustion chambers 6 of the engine body 1 is stopped and air flows into the particulate filter 34. For this reason, during fuel cut control, the inside of the particulate filter 34 becomes an air atmosphere. Therefore, if the filter temperature TF becomes the first temperature setting TF1 or more, the main constituent of the ash, calcium carbonate $CaCO_3$, is converted to calcium oxide CaO and ash can be separated from the inside circumferential surfaces of the exhaust inflow passages 341.

Further, if, like in the present embodiment, the filter temperature becomes the first temperature setting TF1 or more, by controlling the throttle opening degree TH during fuel cut control to the ash separation opening degree TH2 larger than at normal times, it is possible to make a larger amount of air flow into the particulate filter 34 than during normal fuel cut control to increase the amount of air flowing through the inside of the particulate filter 34. Due to this, it is possible to promote the separation of ash from the inside circumferential surfaces of the exhaust inflow passages 341.

That is, when the main constituent of ash, calcium carbonate $CaCO_3$, is converted to calcium oxide CaO, carbon dioxide $CO_2$ is discharged, so if the amount of flow of air through the inside of the particulate filter 34 is small, the concentration of carbon dioxide in the particulate filter 34 easily rises. As a result, the ash separation temperature becomes higher and separation of ash (conversion to calcium oxide CaO) is liable to slow. Therefore, by making the amount of flow of air through the inside of the particulate filter 34 increase, it is possible to keep the concentration of carbon dioxide in the particulate filter 34 from rising due to the carbon dioxide $CO_2$ discharged when the main constituent of the ash, that is, the calcium carbonate $CaCO_3$, is converted to calcium oxide CaO and to keep the separation of ash from ending up slowing. For this reason, it is possible to promote the separation of ash from the inside circumferential surfaces of the exhaust inflow passages 341.

Further, by making the amount of flow of air through the inside of the particulate filter 34 increase to raise the flow rate (air pressure) of air, ash can more easily be peeled off from the increasingly weak layers of ash, so it is possible to promote separation of ash from the inside circumferential surfaces of the exhaust inflow passages 341. Further, the detached ash becomes easy to move to the downstream ends of the exhaust inflow passages 341 and part of the removed ash becomes easy to discharge to the insides of the adjoining exhaust outflow passages 342 through the partition walls 343 in the process of moving toward the downstream ends of the exhaust inflow passages 341.

Figure 5:
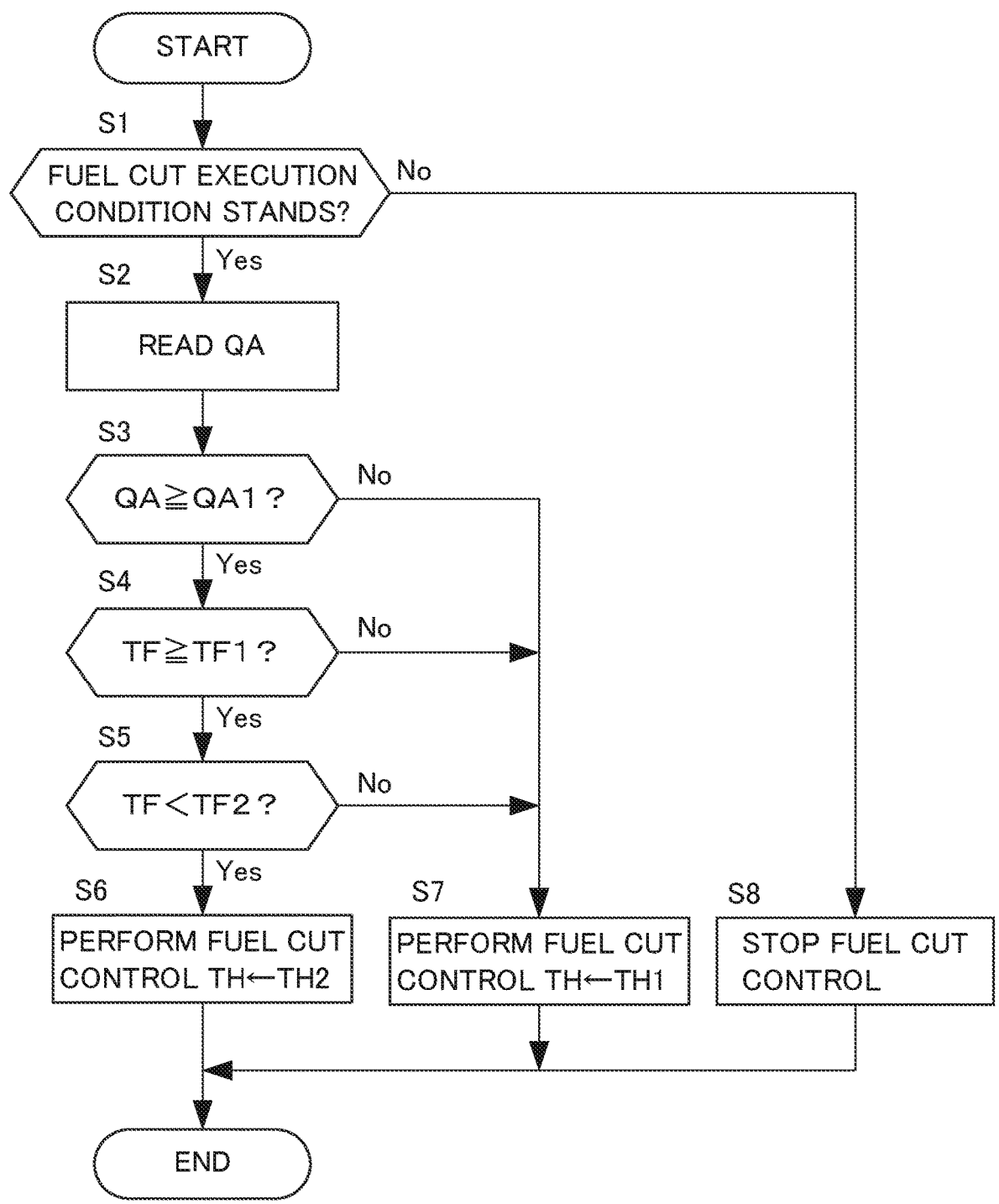
FIG. 5 is a flow chart explaining ash separation control according to the first embodiment of the present disclosure.

FIG. 5 is a flow chart for explaining the ash separation control according to the present embodiment. The electronic control unit 200 repeatedly performs the present routine at predetermined processing cycles during engine operation.

At step S1, the electronic control unit 200 judges if the fuel cut execution condition stands. As the fuel cut execution condition, for example, the amount of depression of the accelerator pedal being zero, the engine rotational speed Ne being a predetermined speed or more, the vehicle speed being a predetermined speed or more, etc. may be mentioned. The electronic control unit 200 proceeds to the processing of step S2 if the fuel cut execution condition stands. On the other hand, the electronic control unit 200 proceeds to the processing of step S8 if the fuel cut execution condition does not stand.

At step S2, the electronic control unit 200 reads the estimated value QA of the ash deposited at the particulate filter 34 (below, referred to as the "estimated value of ash deposition") read at any time during engine operation separate from the present routine.

The estimated value QA of ash deposition can, for example, be calculated using the following formula (1). In formula (1), dQAi is the amount of increase of the deposition of ash per unit time and dQAr is the amount of reduction of the deposition of ash per unit time:

$$QA=QA+dQAi-dQAr \qquad (1)$$

The amount of increase dQAi of the amount of ash deposition can, for example, be calculated based on the engine operating state (engine load L and engine speed Ne) by referring to a map etc. prepared in advance by experiments etc. The amount of reduction dQAr of the amount of ash deposition can, for example, be calculated based on the filter temperature TF and intake amount by referring to a map etc. prepared in advance by experiments etc.

At step S3, the electronic control unit 200 judges if the estimated value QA of ash deposition is a preset predetermined deposition setting QA1 or more. The electronic control unit 200 proceeds to the processing of step S4 if the estimated value QA of ash deposition is the deposition setting QA1 or more. On the other hand, the electronic control unit 200 proceeds to the processing of step S7 if the estimated value QA of ash deposition is less than the deposition setting QA1.

At step S4, the electronic control unit 200 judges if the filter temperature TF is the above-mentioned first temperature setting TF1 or more. Note that in the present embodiment, as explained above, the first temperature setting TF1 is set to 700° C. equivalent to the ash separation temperature when the particulate filter 34 is in an air atmosphere. However, the first temperature setting TF1 need only be suitably selected from a temperature band in which the main constituent of the ash deposited on the particulate filter 34, that is, calcium carbonate $CaCO_3$, can be broken down into calcium oxide CaO and carbon dioxide $CO_2$ when the inside of the particulate filter 34 is in an atmosphere of a concentration of carbon dioxide lower than when it is in an exhaust atmosphere. That is, it need only be suitably selected from a temperature band in which the ash deposited on the particulate filter 34 can be separated when the inside of the particulate filter 34 is in an atmosphere of a concentration of carbon dioxide lower than when it is in an exhaust atmosphere. The electronic control unit 20 proceeds to the processing of step S5 if the filter temperature TF is the first temperature setting TF1 or more. On the other hand, the electronic control unit 200 proceeds to the processing of step S7 if the filter temperature TF is less than the first temperature setting TF1.

At step S5, the electronic control unit 200 judges if the filter temperature TF is less than a predetermined second temperature setting TF2 set for the purpose of preventing an excessive rise in temperature of the catalyst device 33. In the present embodiment, the second temperature setting TF2 is set to 900° C. The electronic control unit 200 proceeds to the processing of step S6 if the filter temperature TF is less than the second temperature setting TF2. On the other hand, the electronic control unit 200 proceeds to the processing of step S7 if the filter temperature TF is the second temperature setting TF2 or more.

This is because, if proceeding to step S6 when the filter temperature TF is the second temperature setting TF2 or more, the temperature of the catalyst device 33 becomes too high and the catalyst device 33 is liable to deteriorate. That is, at the later explained step S6, the throttle opening degree TH is made larger than during normal fuel cut control, so a larger amount of air (oxygen) flows into the catalyst device 33 than during normal fuel cut control. For this reason, in the catalyst device 33, an oxidation reaction more easily occurs and the temperature of the catalyst device 33 more easily rises. Further, when the filter temperature TF becomes a high temperature, the catalyst device 33 may also conceivably become a high temperature. For this reason, if making the throttle opening degree TH larger than during normal fuel cut control when the filter temperature TF becomes the second temperature setting TF2 or more, the temperature of the catalyst device 33 is liable to become too high and the catalyst device 33 is liable to deteriorate.

At step S6, the electronic control unit 200 controls the throttle valve 24 so that the throttle opening degree TH becomes the above-mentioned ash separation opening degree TH2 and performs fuel cut control.

At step S7, the electronic control unit 200 controls the throttle valve 24 so that the throttle opening degree TH becomes the above-mentioned normal opening degree setting TH1 so as to perform fuel cut control. The normal opening degree setting TH1 is made any throttle opening degree (for example 10%) at which a suitable feeling of deceleration is obtained due to engine braking during fuel cut control. Note that, the normal opening degree setting TH1 may also be suitably changed in accordance with the engine rotational speed etc. during fuel cut control.

At step S8, the electronic control unit 200 stops the fuel cut control.

Note that in the present embodiment, as shown in step S2 and step S3 of the flow chart of FIG. 5, the estimated value QA of ash deposition was calculated and whether the estimated value QA of ash deposition was the deposition setting QA1 or more was judged, but such processing is not necessarily required. When the fuel cut execution condition stands, it is also possible to proceed to the processing of step S4 and on without regard as to the estimated value QA of ash deposition (that is, without performing the processing of step S2 and step S3).

Figure 6:
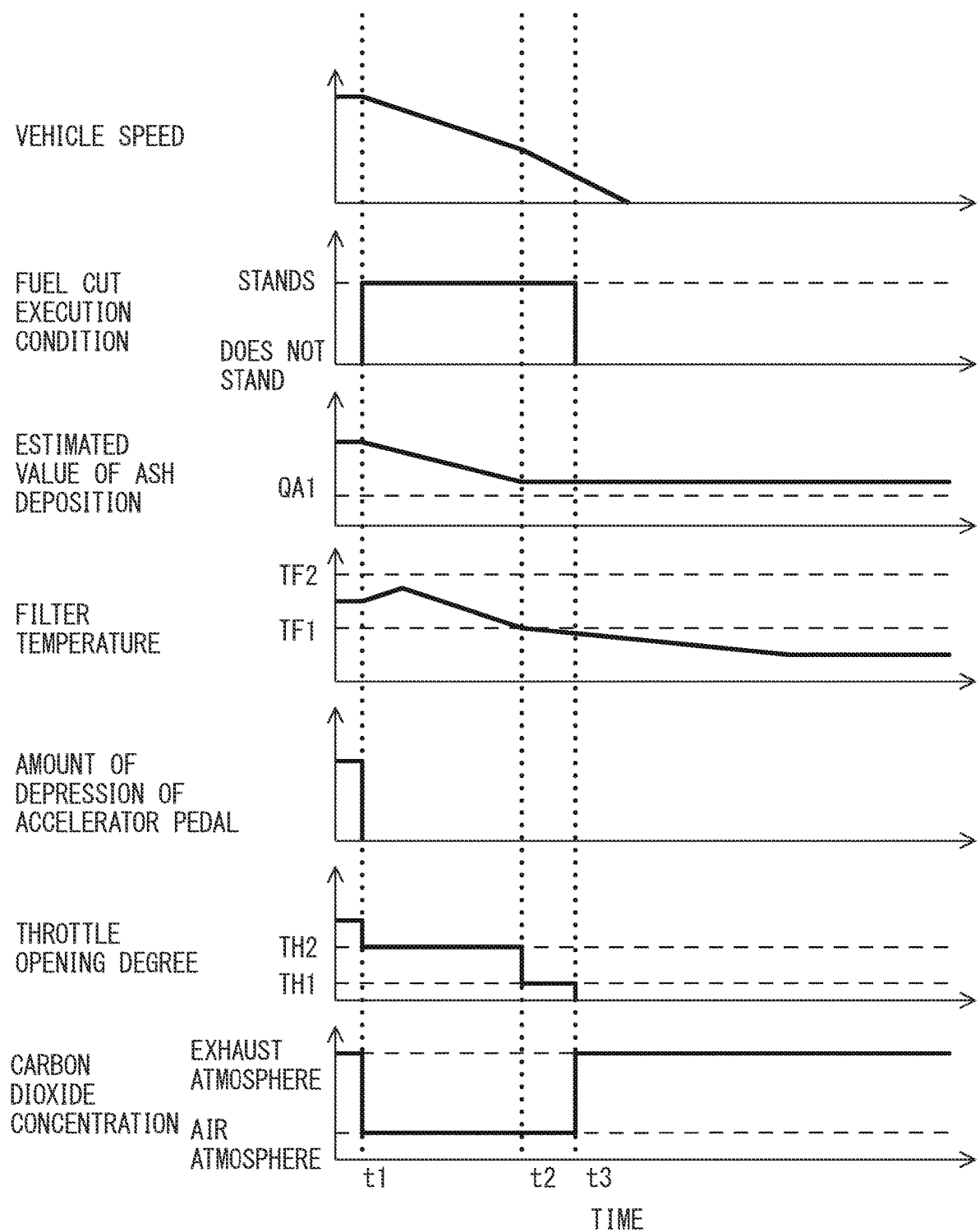
FIG. 6 is a time chart explaining the operation in ash separation control according to the first embodiment of the present disclosure.

FIG. 6 is a time chart for explaining the operation of ash separation control according to the present embodiment.

If, at the time t1, for example, the amount of depression of the accelerator pedal becomes zero and the fuel cut execution condition stands, fuel cut control is performed. At this time, in the time chart shown in FIG. 6, at the point of the time t1, the estimated value QA of ash deposition is the deposition setting QA1 or more. Further, the filter temperature TF becomes the first temperature setting TF1 or more and less than the second temperature setting TF2, so fuel cut control is performed in the state where the throttle opening degree TH is rendered the ash separation opening degree TH2. Due to the fuel cut control being performed, the inside of the particulate filter 34 changes from the exhaust atmosphere to the air atmosphere and ash is separated from the particulate filter 34.

If, at the time t2, along with performance of fuel cut control, the filter temperature TF falls and becomes less than the first temperature setting TF1, the throttle opening degree TH is made the normal opening degree setting TH1. At the time t2 on, removal of ash from the particulate filter 34 slows.

Further, at the time t3, if for example, the vehicle speed (or engine rotational speed) becomes a predetermined value or less, the fuel cut execution condition does not stand and fuel starts to be burned inside the combustion chambers 6 so as to maintain the engine rotational speed at the idling speed. Due to this, the inside of the particulate filter 34 again changes from the air atmosphere to the exhaust atmosphere.

The internal combustion engine 100 according to the present embodiment explained above is provided with an engine body 1, a particulate filter 34 provided in an exhaust passage of the engine body 1 and trapping particulate matter in exhaust (filter), and a catalyst device 33 provided in the exhaust passage at the upstream side from the particulate filter 34 in the direction of exhaust flow. Further, the electronic control unit 200 (control device) controlling this internal combustion engine 100 is provided with a carbon dioxide concentration control part which lowers the concentration of carbon dioxide in the exhaust flowing into the particulate filter 34 when the filter temperature TF is a predetermined first temperature setting TF1 or more and less than a predetermined second temperature setting TF2 higher than the first temperature setting TF1. The first temperature setting TF1 is a temperature selected from a temperature band at which ash deposited on a particulate filter 34 can be separated from the particulate filter 34 when the inside of the particulate filter 34 is in an atmosphere of a lower concentration of carbon dioxide than when it is in an exhaust atmosphere. The second temperature setting TF2 is a temperature set so as to prevent excessive rise of temperature of the catalyst device 33.

In this way, by lowering the concentration of carbon dioxide in the exhaust when the filter temperature TF becomes the first temperature setting TF1 or more, it is possible to make the concentration of carbon dioxide in the particulate filter 34 approach the concentration of carbon dioxide in the atmosphere, so it is possible to lower the ash separation temperature toward the first temperature setting TF1. For this reason, for example, even in an internal combustion engine 100 with a high concentration of carbon dioxide in the exhaust such as a gasoline engine, it is possible to separate ash from the particulate filter 34 in a temperature region lower than the temperature region in which the catalyst device 33 ends up deteriorating (temperature region exceeding 900° C.). Further, when the filter temperature TF becomes the second temperature setting TF2 or more, the concentration of carbon dioxide in the exhaust is prevented from falling, so, for example, it is possible to keep an oxidation reaction from easily occurring at the catalyst device 33 due to lowering the concentration of carbon dioxide in the exhaust and the temperature of the catalyst device 33 from ending up becoming too high. Therefore, it is possible to keep the catalyst device 33 from ending up deteriorating.

In particular, in the present embodiment, the carbon dioxide concentration control part is configured to perform fuel cut control stopping the feed of fuel to the combustion chambers 6 of the engine body 1 so that the concentration of carbon dioxide in the particulate filter 34 becomes equivalent to the concentration of carbon dioxide in the air and thereby lower the concentration of carbon dioxide in the exhaust flowing into the particulate filter 34. Further, the first temperature setting TF1 is made a temperature at which the ash deposited on the particulate filter 34 is removed from the particulate filter 34 when the inside of the particulate filter 34 is an air atmosphere.

Due to this, it is possible to make the concentration of carbon dioxide in the particulate filter 34 fall to substantially equivalent to the concentration of carbon dioxide in the air. That is, when the filter temperature TF becomes the first temperature setting TF1 or more, the inside of the particulate filter 34 can be rendered the air atmosphere, so ash can be reliably separated from the particulate filter 34.

Further, in the present embodiment, the carbon dioxide concentration control part is configured to increase the amount of air flowing into the particulate filter 34 to thereby make the concentration of carbon dioxide in the exhaust flowing into the particulate filter 34 fall when the filter temperature TF becomes the first temperature setting TF1 or more and less than the second temperature setting TF2. Specifically, in the present embodiment, when performing fuel cut control when the filter temperature TF becomes the first temperature setting TF1 or more and less than the second temperature setting TF2, the carbon dioxide concentration control part is configured so as to increase the opening degree of the throttle valve 24 for adjusting the intake amount taken into the engine body 1 more than the normal fuel cut control performed when the filter temperature TF is less than the first temperature setting TF1.

Due to this, it is possible to make the amount of air flowing through the inside of the particulate filter 34 increase, so it is possible to keep down the rise in the concentration of carbon dioxide in the particulate filter 34 to promote separation of ash from the particulate filter 34. Further, movement of the separated ash to the downstream ends and discharge through the partition walls 343 to the insides of the exhaust outflow passages 342 becomes easy.

Second Embodiment

Next, a second embodiment of the present disclosure will be explained. The present embodiment differs from the first embodiment on the point of controlling the throttle valve 24 so that the throttle opening degree TH becomes the ash separation opening degree TH2 from the normal opening degree setting TH1 after the integrated value IGa of the intake amounts Ga from when fuel cut control is started (below, "intake integrated value") becomes a predetermined integrated value IGa1 or more when performing fuel cut control when the filter temperature TF becomes the first temperature setting TF1 or more and less than the second temperature setting TF2. Below, this point of difference will be focused on in the explanation.

In the above-mentioned first embodiment, when performing fuel cut control when the filter temperature TF is the first temperature setting TF1 or more and less than the second temperature setting TF2, the throttle valve 24 was controlled so that the throttle opening degree TH became the ash separation opening degree TH2 at the same time as the start of fuel cut control. However, if doing this, at the same time as the start of fuel cut control, low temperature air flows into the particulate filter 34 in a large amount, so the filter temperature TF ends up falling and is liable to become below the first temperature setting TF1.

Here, in the present embodiment, the throttle opening degree TH was controlled to the normal opening degree setting TH1 until the intake integrated value IGa from when fuel cut control was started became the predetermined integrated value IGa1 or more. By doing this, it is possible to keep down the drop in filter temperature TF and reliably separate ash inside the particulate filter 34 (convert it to calcium oxide CaO).

Further, separation of ash was promoted by controlling the throttle opening degree TH to the ash separation opening degree TH2 to increase the amount of air flowing through the inside of the particulate filter 34 after the intake integrated value IGa from when fuel cut control was started becomes a predetermined integrated value IGa1 or more. That is, the rise in the concentration of carbon dioxide in the particulate filter 34 was kept down and movement of the removed ash to the downstream ends and discharge through the partition walls 343 to the inside of the exhaust outflow passages 342 became easy.

Figure 7:
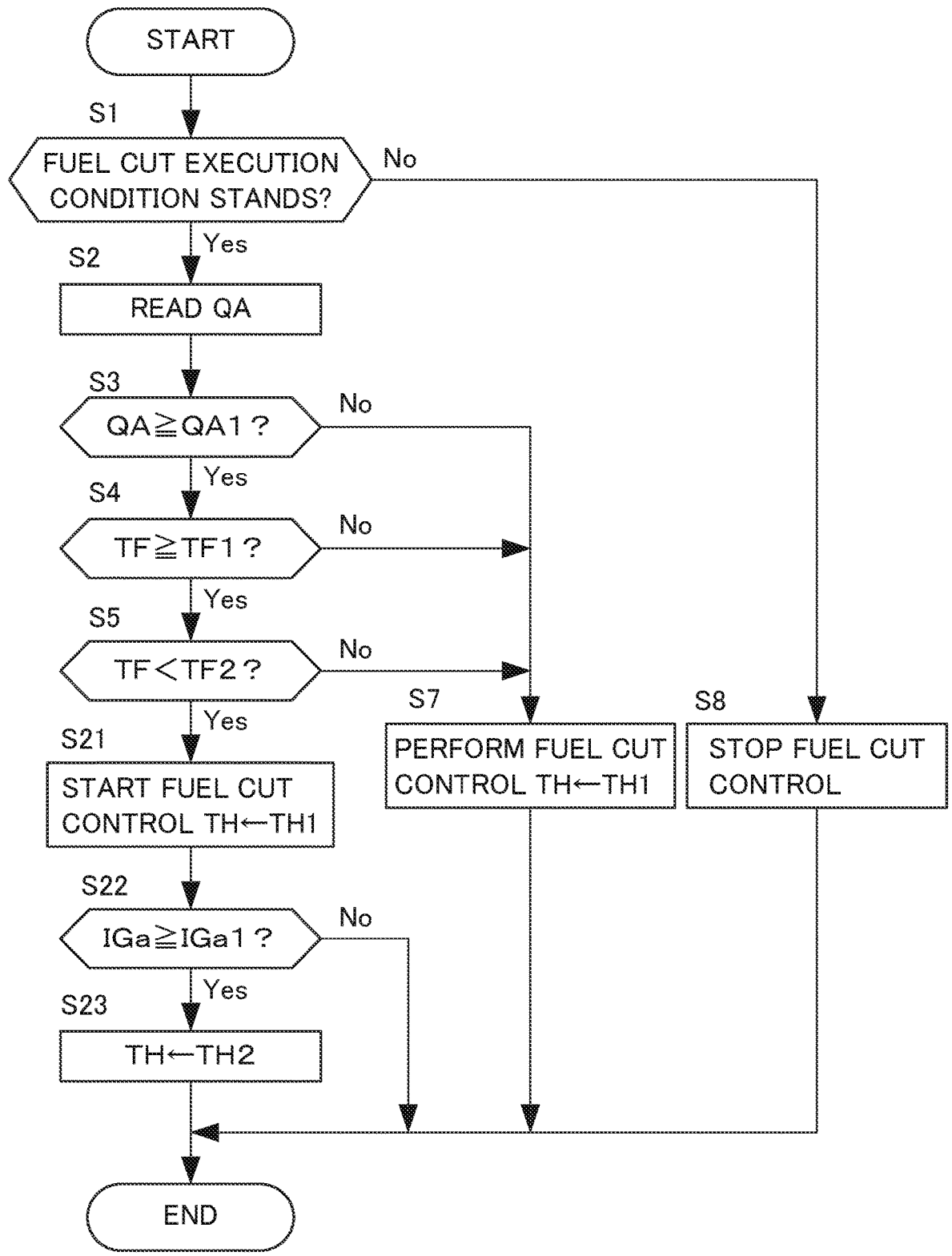
FIG. 7 is a flow chart explaining ash separation control according to a second embodiment of the present disclosure.

FIG. 7 is a flow chart for explaining ash separation control according to the present embodiment. The electronic control unit 200 repeatedly performs this routine during engine operation at predetermined processing cycles. Note that, in FIG. 7, the contents of the processing from step S1 to step S5, step S7, and step S8 are similar to those of the first embodiment, so here the explanations will be omitted.

At step S21, the electronic control unit 200 controls the throttle valve 24 to start fuel cut control so that the throttle opening degree TH becomes the normal opening degree setting TH1.

At step S22, the electronic control unit 200 judges if the integrated value of the intake amounts Ga from when starting fuel cut control, defined as the intake integrated value IGa, is a predetermined integrated value IGa1 or more. If the intake integrated value IGa is a predetermined integrated value IGa1 or more, the electronic control unit 200 proceeds to the processing of step S23. On the other hand, if the intake integrated value IGa is less than the predetermined integrated value IGa1, the electronic control unit 200 ends the current processing and continues fuel cut control while maintaining the throttle opening degree TH at the normal opening degree setting TH1.

At step S23, the electronic control unit 200 controls the throttle valve 24 so that the throttle opening degree TH becomes the ash separation opening degree TH2 and continues fuel cut control.

Note that in the present embodiment, when the intake integrated value IGa from when starting fuel cut control becomes the predetermined integrated value IGa1 or more, the throttle opening degree TH was changed from the normal opening degree setting TH1 to the ash separation opening degree TH2, but the disclosure is not limited to this. For example, it is also possible to change the throttle opening degree TH from the normal opening degree setting TH1 to the ash separation opening degree TH2 when the elapsed time from when starting fuel cut control becomes a predetermined time or more.

Figure 8:
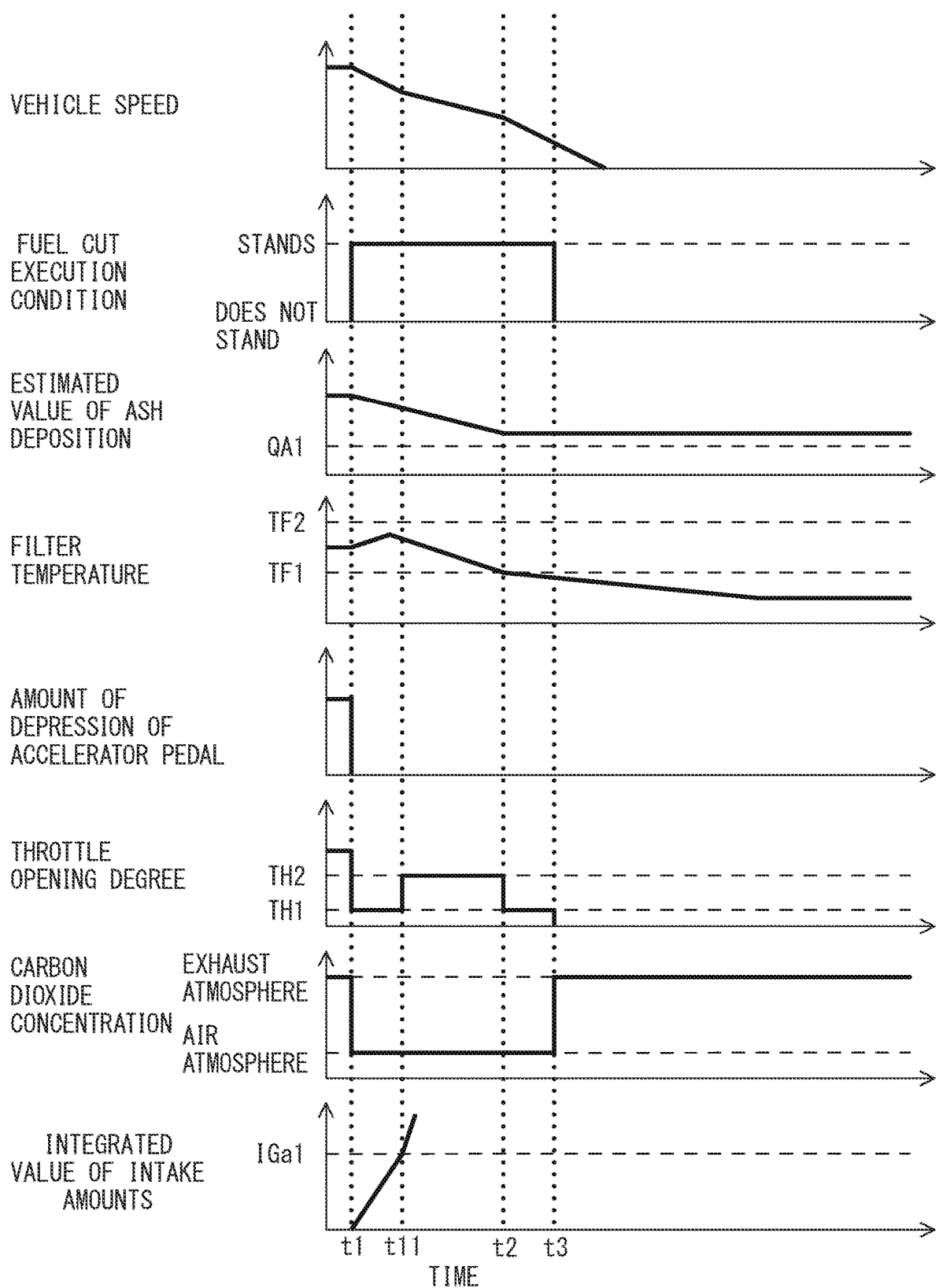
FIG. 8 is a time chart explaining the operation in ash separation control according to the second embodiment of the present disclosure.

FIG. 8 is a time chart for explaining the operation of ash separation control according to the present embodiment.

If, at the time t1, for example, the amount of depression of the accelerator pedal becomes zero and the fuel cut execution condition stands, in the present embodiment, first, fuel cut control is performed in the state where the throttle opening degree TH is rendered the normal opening degree setting TH1 and the intake integrated value IGa from when starting the fuel cut control is calculated. Further, at the time t11, if the intake integrated value IGa becomes a predetermined integrated value IGa1 or more, fuel cut control is performed in the state where the throttle opening degree TH is rendered the ash separation opening degree TH2. The operation at the time t2 and the time t3 and on is similar to that of the first embodiment.

In the present embodiment explained above as well, the electronic control unit 200 (control device) controlling the internal combustion engine 100 is configured provided with a carbon dioxide concentration control part which lowers the concentration of carbon dioxide in the exhaust flowing into the particulate filter 34 when the temperature TF of the particulate filter 34 becomes a predetermined first temperature setting TF1 or more and less than the second temperature setting TF2.

Further, in the present embodiment, the carbon dioxide concentration control part is configured so that, when performing fuel cut control when the temperature of the particulate filter 34 has become the first temperature setting TF1 or more and less than the second temperature setting TF2, the opening degree of the throttle valve 24 is increased over the time of normal fuel cut control after the intake integrated value IGa or the elapsed time from when starting fuel cut control becomes a predetermined value or more.

Due to this, at the same time as the start of fuel cut control, it is possible to keep the filter temperature TF from falling due to low temperature air flowing into the particulate filter 34 in a large amount and, first, reliably separate the ash inside the particulate filter 34 (convert it to calcium oxide CaO). Further, it is possible to promote the separation of the ash by controlling the throttle opening degree TH to the ash separation opening degree TH2 to make the amount of flow of air through the inside of the particulate filter 34 increase after the intake integrated value IGa from when fuel cut control is started becomes a predetermined integrated value IGa1 or more.

Third Embodiment

Next, a third embodiment of the present disclosure will be explained. The present embodiment differs from the first embodiment on the point of increasing a gear ratio of a transmission (not shown) provided in a power transmission path from the internal combustion engine 100 to vehicle drive wheels in a vehicle in which the internal combustion engine 100 is mounted when making the throttle opening degree TH the ash separation opening degree TH2 during fuel cut control. Below, this point of difference will be focused on in the explanation. Note that the "gear ratio of the transmission" is the value obtained by dividing the input rotational speed of the transmission by the output rotational speed of the transmission.

If, as in the above-mentioned first embodiment, ending up making the throttle opening degree TH the ash separation opening degree TH2 larger than the normal opening degree setting TH1 during fuel cut control, the feeling of deceleration by engine braking ends up becoming smaller by exactly the amount of increase of the throttle opening degree TH.

Therefore, in the present embodiment, the gear ratio of the transmission is raised by exactly the amount of increase of the throttle opening degree TH so that a feeling of deceleration equal to that when making the throttle opening degree TH the normal opening degree setting TH1 is obtained even when making the throttle opening degree TH the ash separation opening degree TH2 during fuel cut control.

Figure 9:
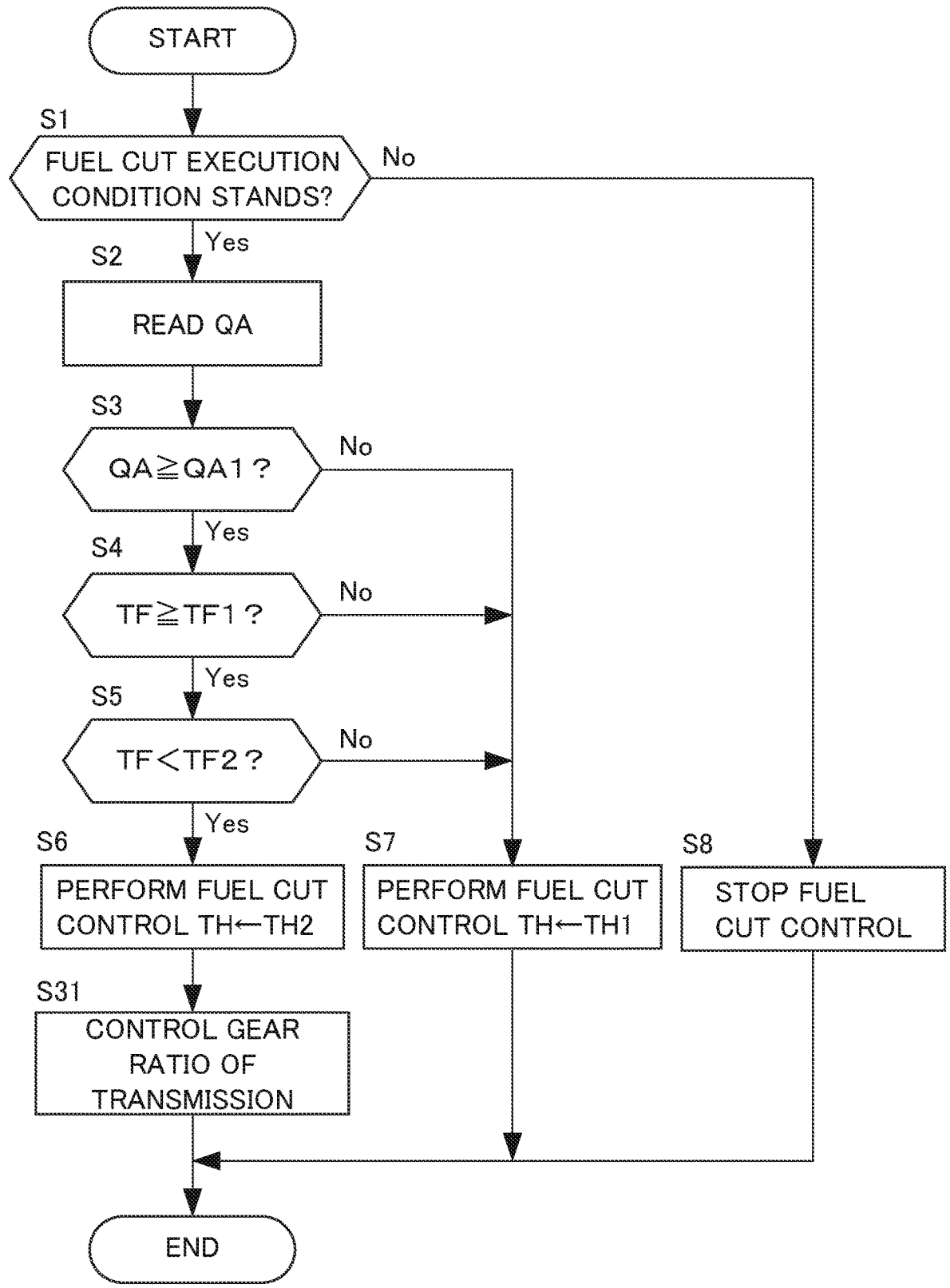
FIG. 9 is a flow chart explaining ash separation control according to a third embodiment of the present disclosure.

FIG. 9 is a flow chart explaining ash separation control according to the present disclosure. The electronic control unit 200 repeatedly performs the present routine at predetermined processing cycles during engine operation. Note that in the present embodiment, the electronic control unit 200 is configured to control the transmission together with the internal combustion engine 100. Further, in FIG. 9, the content of the processing from step S1 to step S8 is similar to the first embodiment, so here the explanation will be omitted.

At step S31, the electronic control unit 200 raises the gear ratio of the transmission by exactly the amount of increase of the throttle opening degree TH so that a feeling of deceleration equal to that when making the throttle opening degree TH the normal opening degree setting TH1 is obtained. The transmission may be a stepped transmission or a continuous transmission. When the transmission is a stepped transmission, the gear can be lowered so as to raise the gear ratio of the transmission.

Figure 10:
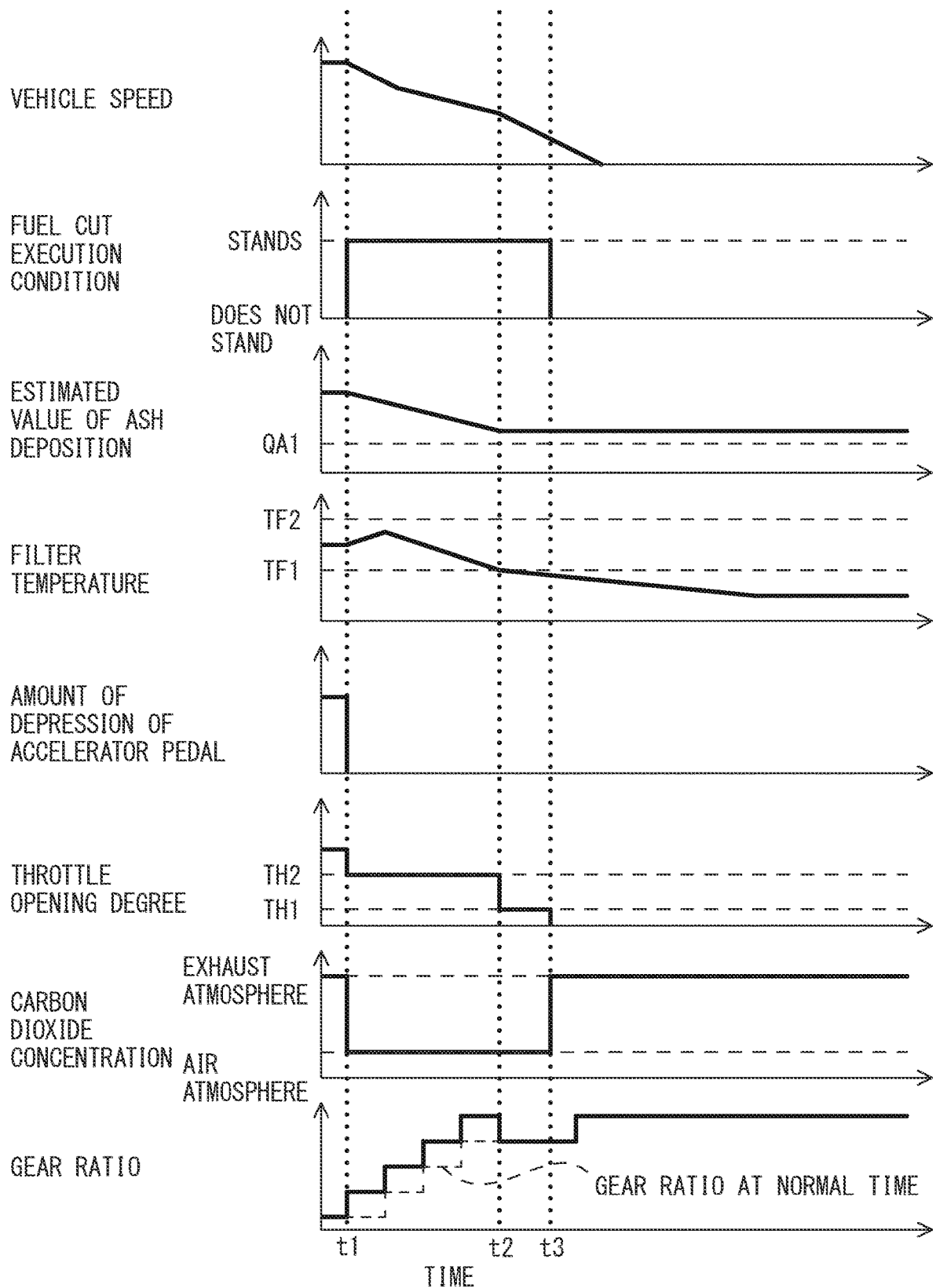
FIG. 10 is a time chart explaining the operation in ash separation control according to the third embodiment of the present disclosure.

FIG. 10 is a time chart explaining the operation in ash separation control according to the present embodiment.

At the time t1, for example, if the amount of depression of the accelerator pedal becomes zero and the fuel cut execution condition stands, in the same way as the first embodiment, fuel cut control is performed in the state with the throttle opening degree TH rendered the ash separation opening degree TH2. At this time, in the present embodiment, the gear ratio is made larger than the gear ratio at normal times by exactly the amount of increase of the throttle opening degree TH over the normal opening degree setting TH1. In the time chart of FIG. 10, the example is shown of the case where the transmission is a stepped transmission. The gear is gradually shifted down in accordance with the drop in the vehicle speed. In the present embodiment, the gear is made a lower gear than normal. Further, at the time t2, if the throttle opening degree TH is made the normal opening degree setting TH1, the gear is returned to the gear ratio of normal times, that is, the gear of normal times.

According to the present embodiment explained above, the electronic control unit 200 is provided with a gear ratio control part making the gear ratio of the transmission provided in the power transmission path from the internal combustion engine 100 to the vehicle drive wheels greater than that at the time of normal fuel cut control performed while making the throttle opening degree TH the normal opening degree setting TH1 when increasing the opening degree of the throttle valve 24 over the time of normal fuel cut control.

Due to this, even if making the throttle opening degree TH the ash separation opening degree TH2 during fuel cut control, a feeling of deceleration similar to that when making the throttle opening degree TH the normal opening degree setting TH1 can be obtained.

Fourth Embodiment

Next, a fourth embodiment of the present disclosure will be explained. The present embodiment differs from the first embodiment on the point that when performing fuel cut control when the filter temperature TF becomes the first temperature setting TF1 or more and less than the second temperature setting TF2, instead of increasing the throttle opening degree TH, it feeds secondary air from the exhaust passage at the upstream side from the particulate filter 34 in the direction of exhaust flow. Below, this point of difference will be focused on in the explanation.

Figure 11:
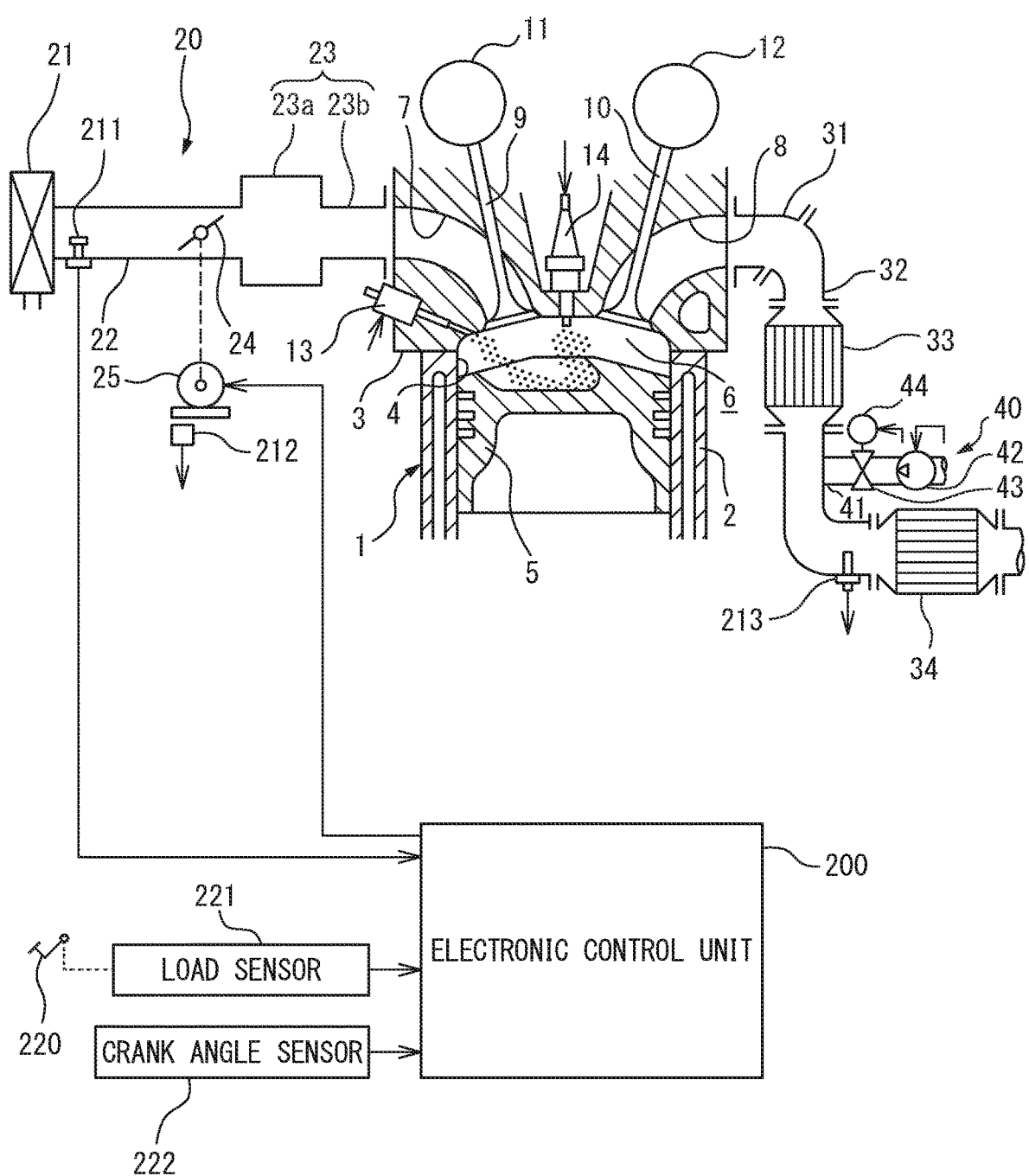
FIG. 11 is a schematic view of the configuration of an internal combustion engine according to a fourth embodiment of the present disclosure and an electronic control unit for controlling the internal combustion engine.

FIG. 11 is a schematic view of the configuration of the internal combustion engine 100 according to the present embodiment and the electronic control unit 200 controlling the internal combustion engine 100.

As shown in FIG. 11, the internal combustion engine 100 according to the present embodiment is provided with a secondary air feed device 40 as an air feed device for introducing air into the particulate filter 34.

The secondary air feed device 40 is a device for feeding secondary air to the exhaust pipe 32 at the upstream side from the particulate filter 34 in the direction of exhaust flow and introducing that secondary air to the particulate filter 34 and is provided with a secondary air feed pipe 41, secondary air feed pump 42, secondary air feed valve 43, and actuator 44 for driving operation of the secondary air feed valve 43.

The secondary air feed pipe 41 is connected to the exhaust pipe 32 at the upstream side from the particulate filter 34 in the direction of exhaust flow.

The secondary air feed pump 42 is provided at the secondary air feed pipe 41. The secondary air feed pump 42 is controlled by the electronic control unit 200 and pumps secondary air through the secondary air feed pipe 41 to the exhaust pipe 32 at the upstream side from the particulate filter 34 in the direction of exhaust flow.

The secondary air feed valve 43 is a normally closed valve and is provided at the secondary air feed pipe 41 at the downstream side from the secondary air feed pump 42 in the direction of secondary air flow. The secondary air feed valve 43 is opened when secondary air should be introduced to the particulate filter 34.

The actuator 54 is controlled by the electronic control unit 200 and drives the secondary air feed valve 43 to the open side when secondary air should be introduced into the particulate filter 34.

Figure 12:
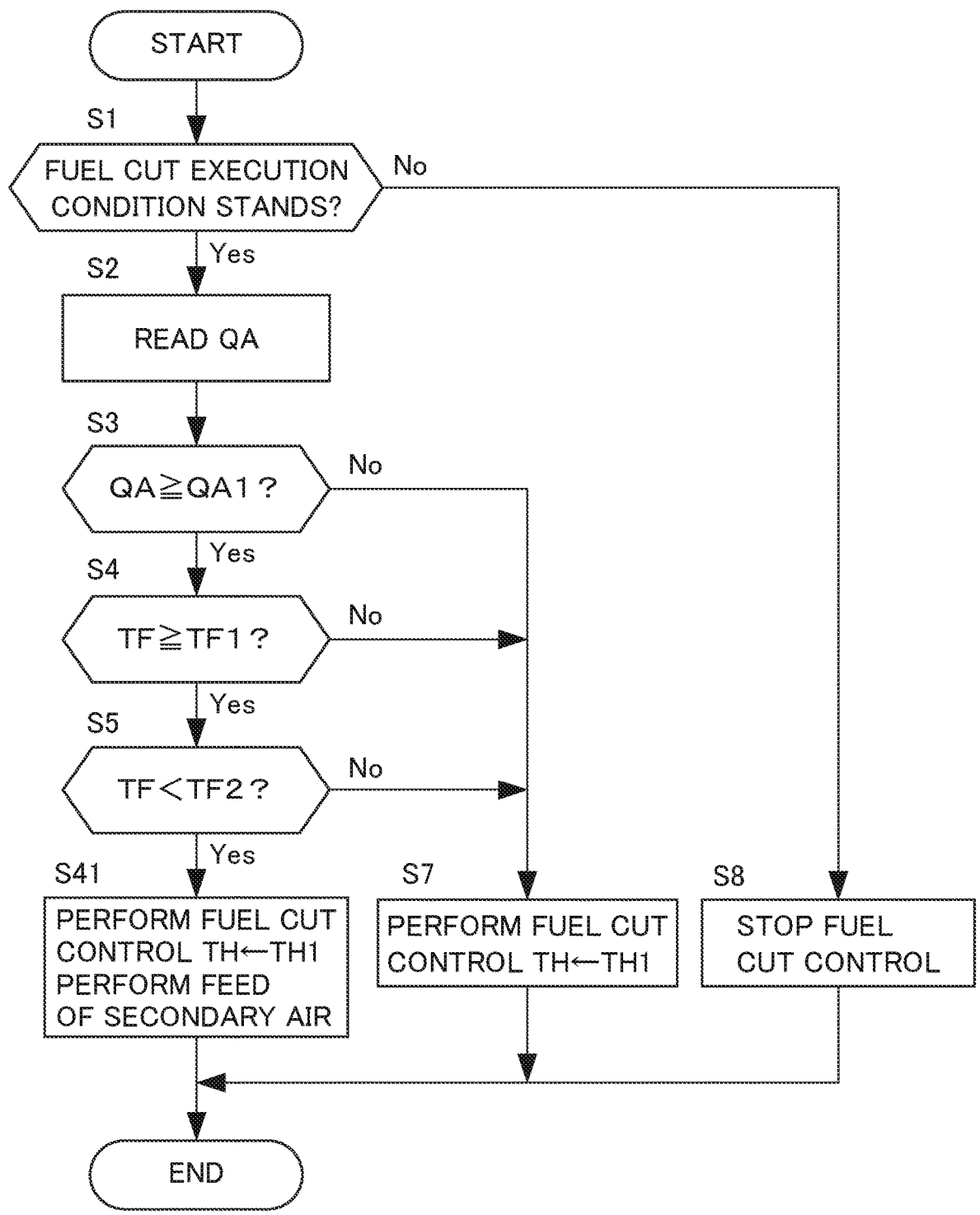
FIG. 12 is a flow chart explaining ash separation control according to the fourth embodiment of the present disclosure.

FIG. 12 is a flow chart for explaining ash separation control according to the present embodiment. The electronic control unit 200 repeatedly performs the present routine during engine operation at predetermined processing cycles. Note that, in FIG. 12, the contents of the processing from step S1 to step S8 are similar to the first embodiment, so here the explanations will be omitted.

At step S41, the electronic control unit 200 controls the throttle valve 24 so that the throttle opening degree TH becomes the normal opening degree setting TH1 to thereby perform fuel cut control and drives the secondary air feed pump 52 and opens the secondary air feed valve 43 to feed secondary air to the exhaust pipe 32 and introduce that secondary air to the inside of the particulate filter 34.

Figure 13:
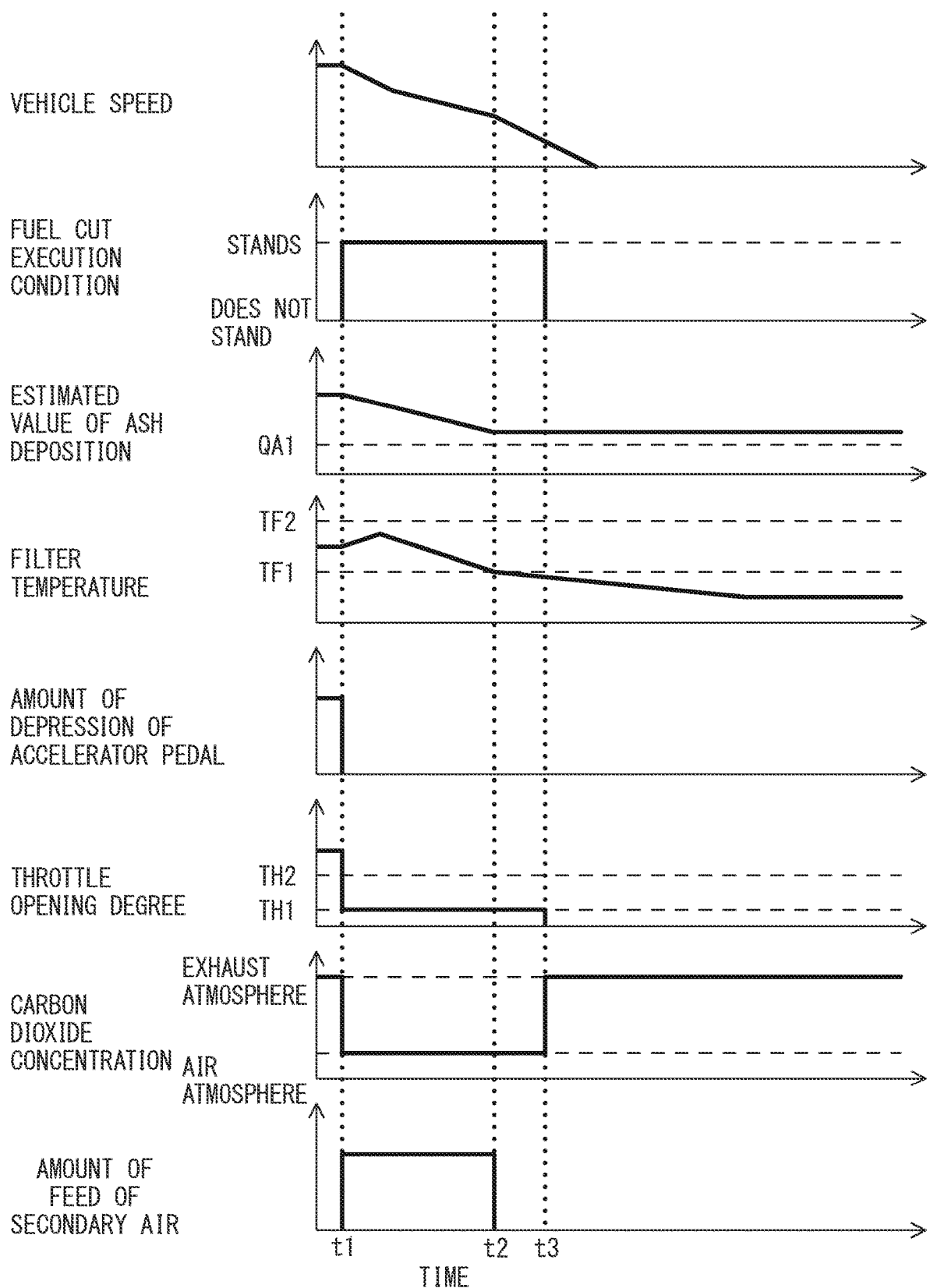
FIG. 13 is a time chart explaining the operation in ash separation control according to the fourth embodiment of the present disclosure.

FIG. 13 is a time chart for explaining the operation of ash separation control according to the present embodiment.

At the time t1, for example, if the amount of depression of the accelerator pedal becomes zero and the fuel cut execution condition stands, in the present embodiment, fuel cut control is performed in the state with the throttle opening degree TH rendered the ash separation opening degree TH1. Secondary air starts to be fed before the time t2 when the filter temperature TF becomes the first temperature setting TF1 or more. Further, at the time t2 on, the feed of secondary air is stopped. Up to the time t3, fuel cut control is performed in the state with the throttle opening degree TH rendered the ash separation opening degree TH1.

According to the present embodiment explained above, the internal combustion engine 100 is further provided with a secondary air feed device 40 for feeding secondary air to the exhaust passage at the upstream side from the particulate filter 34 in the direction of exhaust flow. The carbon dioxide concentration control part of the electronic control unit 200 is configured so that when the filter temperature TF becomes the first temperature setting TF1 or more and less than the second temperature setting TF2, it uses the secondary air feed device 40 to feed secondary air to the exhaust passage and thereby lower the concentration of carbon dioxide in the exhaust flowing into the particulate filter 34. Even if doing this, it is possible to obtain effects similar to the first embodiment where the throttle opening degree TH was made the ash separation opening degree TH2.

Above, embodiments of the present disclosure were explained, but the present embodiments only show some of the examples of application of the present disclosure and are not intended to limit the technical scope of the present disclosure to the specific configurations of the embodiments.

The invention claimed is:

1. A control device for an internal combustion engine, the internal combustion engine comprising:
   an engine body;
   a filter provided in an exhaust passage of the engine body and configured to trap particulate matter in exhaust; and
   a catalyst device provided in the exhaust passage at the upstream side from the filter in the direction of exhaust flow, wherein
   the control device comprises an electronic control unit configured to cause a concentration of carbon dioxide in exhaust flowing into the filter to decrease when the temperature of the filter becomes a predetermined first temperature setting or more and less than a predetermined second temperature setting higher than the first temperature setting,
   the first temperature setting is a temperature selected from a temperature band at which ash deposited on the filter can be made to separate from the filter when the inside of the filter is in an atmosphere where the concentration of carbon dioxide is lower than when it is in an exhaust atmosphere, and
   the second temperature setting is a temperature set so as to prevent excessive temperature rise of the catalyst device.

2. The control device for the internal combustion engine according to claim 1, wherein
the electronic control unit is further configured to lower a concentration of carbon dioxide in the exhaust flowing into the filter so that the concentration of carbon dioxide inside the filter becomes equivalent to the concentration of carbon dioxide in air when the temperature of the filter becomes the first temperature setting or more and less than the second temperature setting, and
the first temperature setting is made a temperature at which the ash deposited on the filter separates from the filter when the inside of the filter is in an air atmosphere.

3. The control device for the internal combustion engine according to claim 1, wherein
the electronic control unit is further configured to lower the concentration of carbon dioxide in the exhaust flowing into the filter by increasing the amount of air flowing into the filter when the temperature of the filter becomes the first temperature setting or more and less than the second temperature setting.

4. The control device for the internal combustion engine according to claim 1, wherein
the internal combustion engine further comprises a secondary air feed device for feeding secondary air to the exhaust passage at the upstream side of the filter in the direction of exhaust flow, and
the electronic control unit is further configured to lower a concentration of carbon dioxide in exhaust flowing into the filter by using the secondary air feed device to feed secondary air to the exhaust passage when the temperature of the filter becomes the first temperature setting or more and less than the second temperature setting.

5. The control device for the internal combustion engine according to claim 1, wherein
the electronic control unit is further configured to lower the concentration of carbon dioxide in the exhaust flowing into the filter by performing fuel cut control stopping the supply of fuel to combustion chambers of the engine body when the temperature of the filter becomes the first temperature setting or more and less than the second temperature setting.

6. The control device for the internal combustion engine according to claim 5, wherein,
when performing fuel cut control when the temperature of the filter becomes the first temperature setting or more and less than the second temperature setting, the electronic control unit is further configured so as to increase an opening degree of a throttle valve for adjusting an intake amount taken into the engine body more than a normal fuel cut control performed when the temperature of the filter is less than the first temperature setting.

7. The control device for the internal combustion engine according to claim 6, wherein,
the electronic control unit is further configured so that if performing the fuel cut control when the temperature of the filter becomes the first temperature setting or more and less than the second temperature setting, it makes the opening degree of the throttle valve larger than the normal fuel cut control after an integrated value of intake amounts or the elapsed time, from starting the fuel cut control becomes a predetermined value or more.

8. The control device for the internal combustion engine according to claim 6, wherein the electronic control unit is further configured to increase a gear ratio of a transmission provided in a power transmission path from the internal combustion engine to vehicle drive wheels more than the normal fuel cut control when increasing the opening degree of the throttle valve to more than at the time of normal fuel cut control.

\* \* \* \* \*